Patented Nov. 10, 1953

UNITED STATES PATENT OFFICE 2,658,910

PROCESS FOR PREPARING 1,2,3,4-TETRAHYDROPHENANTHRENES

William S. Johnson, Madison, Wis., and Daniel L. Turner, Philadelphia, Pa., assignors to Wisconsin Alumni Research Foundation, Madison, Wis., a corporation of Wisconsin No Drawing. Application December 15, 1950,
Serial No. 201,056

6 Claims. (Cl. 260—473)

The present invention relates to the synthesis of bisdehydroisynolic acid and related products and more particularly to an improved step in the synthesis in which the half ester I is cyclized to give high yields of the desired phenanthrene ketone II. The half ester I and the phenanthrene ketone II may be represented by the following formulas:

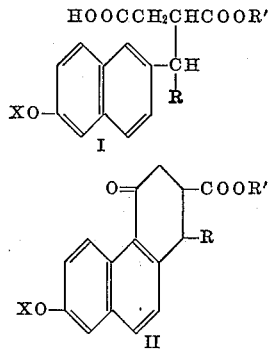

where X is a group such as a lower alkyl group (methyl, ethyl, etc.) an aralkyl group (benzyl) or an aryl group (phenyl), R represents a lower alkyl group containing 1–4 carbon atoms, and R' is a lower alkyl group or hydrogen when the product is unesterified.

In the synthesis of the potent estrogen bisdehydroisynolic acid described by Johnson and Graber, J. Am. Chem. Soc. 70, 2612 (1948); 72, 925 (1950), only one of the steps leaves much to be desired, namely, the cyclization of the dibasic acid or its anhydride which gave the desired phenanthrene ketone in at best only about 20% yield. The main product was the isomeric benzhydrindone arising from the five- instead of the six-membered ring closure. These findings have been confirmed in essence by Heer and Miescher, Helv. Chim. Acta, 33, 178 (1950).

We have discovered that the ketone II may be obtained in high yields by cyclization of the acid halide of the half ester in the cold. This is preferably done by treating a solution of the half ester I with a halide of a strong acid such as thionyl chloride, phosphorus pentachloride, phosphorus tribromide and the like, and then treating the reaction mixture containing the acid halide in the cold with a Friedel-Crafts type of catalyst such as stannic chloride. Under these conditions cyclization readily occurs to give the desired ketone of good purity in over 67% yields. The following examples will serve to illustrate the invention:

EXAMPLE I

Methyl 1-ethyl-4-keto-7-methoxy-1,2,3,4-tetrahydrophenanthrene-2-carboxylate (a) BY THE THIONYL CHLORIDE-STANNIC CHLORIDE METHOD A cool solution of 0.330 g. of the half ester 3-carbomethoxy - 4 - (6 - methoxy - 2 - naphthyl) - caproic acid, M. P. 142–145° C., in 10 ml. of dry ether was treated with 2 drops of pyridine and 0.4 ml. of thionyl chloride. The mixture was allowed to stand at 10° C. for two hours with occasional swirling, then evaporated at reduced pressure (water pump) at 10° C. Benzene (5 ml.) was added and the evaporation process repeated at 10° C. leaving a syrupy residue which was finally dried at 0.5 mm. for one-half hour. This product was dissolved in 10 ml. of dry thiophene-free benzene, and the mixture cooled in an ice-bath until the benzene began to solidify. A solution of 0.4 ml. of anhydrous stannic chloride in 0.4 ml. of thiophene-free benzene was then added, and the mixture was shaken vigorously. A bright red complex formed rapidly. After standing for fifteen minutes at 0° C. the suspension was treated with a mixture of ice and 2 ml. of concentrated hydrochloric acid, ether was added and the whole was shaken vigorously to decompose the complex. The organic layer was separated, washed with water, then with 5% potassium hydroxide solution and dried over anhydrous sodium sulfate. Evaporation of the solvents gave a crude solid which on crystallization from methanol gave 67.5% yield of the desired ketone M. P. 128–130° C. Additional product in relatively small amounts also may be recovered from the mother liquor if desired.

In another cyclization carried out just as described above except that the temperature during the preparation of the acid chloride was maintained at 23° C. and gave a 64% yield M. P. 129–130° C. of the desired product.

(b) BY THE PHOSPHORUS PENTACHLORIDE-STANNIC CHLORIDE METHOD

To a cold solution of 0.330 g. of the half ester used in Example I(a) in 10 ml. of thiophene-free benzene was added 0.260 g. of phosphorus pentachloride in three portions. The mixture was allowed to stand at 0° C. for forty-five minutes with frequent shaking. A solution of 0.4 ml. of stannic chloride in 0.4 ml. of thiophene-free benzene was then added, and the mixture allowed to stand for ten minutes at 0° C. The red complex was decomposed with acid and the product worked up as described above in Example I(a). The yield of the keto ester was 67.5% M. P. 126–129° C.

In another similar experiment in which the amount of phosphorus pentachloride was increased to 0.410 g., the yield of the keto ester was 68.5% M. P. 125–129° C.

EXAMPLE II

*Methyl 1-methyl-4-keto-7-methoxy-1,2,3,4-tetrahydrophenanthrene-2-carboxylate*

(a) (α-FORM)

To a cooled solution of 2.5 ml. of dry ether containing 1 drop of pyridine was added 1 ml. of purified thionyl chloride, followed by 1.90 g. of the α-half ester 3-carbomethoxy-4-(6-methoxy-2-naphthyl)-valeric acid M. P. 118–121° C. The acid was dissolved by swirling, and the mixture was allowed to stand at 25° C. for one-half hour. The solvent and excess thionyl chloride was removed in vacuo, the temperature never exceeding 40° C.; then a few millimeters of dry benzene was added and the concentration process repeated followed by evacuation at < 1 mm. with warming at 40° C. The oily residue was dissolved in 10 ml. of dry thiophene-free benzene, cooled to 5° C. and then a solution of 2 ml. of anhydrous stannic chloride in 2 ml. of benzene was added. The mixture containing the complex was swirled at 5° C. for ten minutes, then treated with a mixture of ice and 50 ml. of concentrated hydrochloric acid. Ether was added, and the organic layer was separated, washed with 10% hydrochloric acid, then with saturated sodium bicarbonate, and dried over anhydrous sodium sulfate. The residue obtained on evaporation of the ether was crystallized from methanol giving a 67% yield of the desired product as faintly yellow long irregular hexagonal plates M. P. 110–111° C.

(b) (β-FORM)

The cyclization of 5.00 g. of the β-half ester, M. P. 158–160° C. was carried out by the procedure described for the α-stereoisomer in Example II(a). The keto ester crystallized from methanol in about 73% yield, M. P. 110–111° C. Recrystallization gave the desired ketone as colorless hexagonal plates, M. P. 114–115.5° C.

The half esters may be prepared in accordance with the procedures described in the literature; the preparation of the half ester β-carboxy-γ-(6-methoxy-2-naphthyl) caproic acid being an example which is also described in the copending application of Johnson and Graber, Serial No. 106,494, filed July 23, 1949, now U. S. Patent No. 2,574,396. The process comprises the Stobbe condensation of a lower dialkyl succinate with a 2-lower acyl-6-oxynaphthalene and catalytic hydrogenation of the resulting condensation products to form the desired half esters. When dimethyl succinate, for example, is condensed with 2 - acetyl - 6 - methoxynaphthalene, the half ester obtained is the α and β forms of 3-carbomethoxy - 4 - (6 - methoxy - 2 - naphthyl) - valeric acid, and when a dialkyl succinate is condensed with 2-propionyl-6-methoxynaphthalene, the half ester obtained is 3-carbo-alkoxy-4-(6-methoxy-2-naphthyl)-caproic acid. The half esters may also be obtained by the selective saponification of the dialkyl esters. In formula I, R is methyl when the valeric acid derivative is formed and R is ethyl when the caproic acid derivative is formed. Other 2-acyl-naphthalene derivatives may also be used in the Stobbe condensation, although the propionyl derivative is the product used to prepare bisdehydrodoisynolic acid where R is ethyl. The methoxy group at the 6-position on the 2-acyl naphthalene may be any hydrocarbon-oxy group such as ethoxy, benzyloxy or phenoxy. The group "X" is merely used during the reactions to protect the potential hydroxyl group and except for this is of no importance as it is removed by hydrolysis in the final steps of the synthesis to provide a free hydroxy group. The "XO" group is referred to herein as an "oxy" group.

The half esters are butyric acid derivatives having the R or lower alkyl group at the gamma position. As explained above R is methyl when the starting material is 2-acetyl-6-oxynaphthalene and ethyl when the starting material is 2-propionyl-6-oxynaphthalene. Similarly R is propyl and butyl respectively when the starting materials are 2-butyryl-6-oxynaphthalene and 2-valeryl-6-oxynaphthalene. By condensing this last product with diethyl succinate and hydrogenation of the resulting composition the half ester obtained is beta-(carboethoxy)-gamma-(6-oxy - 2 - naphthyl) - gamma - butyl - butyric acid. The acid halide of this product treated in the cold with a Friedel-Crafts catalyst gives 1 - butyl - 2 - carboethoxy - 4 - keto - 7 - oxy - 1,2,3,4-tetrahydrophenanthrene.

The acid halides of the half esters i. e. beta-(carbo - lower - alkoxy) - gamma - (6 - hydrocarbon - oxy - 2 - naphthyl) - gamma - lower alkylbutyric acids, are prepared by treating the half ester with a halide of a strong acid as shown in the examples. The strong acids should be derived from an acid having a dissociation constant at least about $10^{-3}$. Examples are phosphorus trichloride, phosphorus oxychloride, oxalyl chloride, thionyl bromide along with the chlorine and bromine halogenating agents mentioned above. In place of the stannic chloride employed in the examples other Friedel-Crafts metal halides may be used such as anhydrous aluminum chloride, zinc chloride, boron trifluoride, etc. Hydrogen fluoride also may be used to cyclize the half ester I. Cyclization in the cold is essential to obtain high yields of the desired ketone.

We claim:

1. The process for preparing 1-lower-alkyl-2-carbo - lower - alkoxy - 4 - keto - 7 - XO - 1,2,3,4-tetrahydrophenanthrene which comprises treating in the cold the acid halide of beta-(carbo - lower - alkoxy) - gamma - (6 - XO - 2 - naphthyl)-gamma-lower-alkylbutyric acid with a Friedel-Crafts type of catalyst, where X is a hydrocarbon group selected from the class consisting of lower alkyl groups and benzyl and phenyl groups.

2. The process for preparing lower alkyl 1-ethyl - 4 - keto - 7 - methoxy - 1,2,3,4 - tetra - hydrophenanthrene-2-carboxylate which comprises treating in the cold the acid halide of 3 - carbo - alkoxy - 4 - (6 - methoxy - 2 - naphthyl)-caproic acid with a Friedel-Crafts type of catalyst.

3. The process of claim 2 where the acid halide is the acid chloride of the caproic acid and the Friedel-Crafts metal halide is stannic chloride.

4. The process which comprises reacting the half ester beta-(carbo-lower-alkoxy)-gamma-(6 - XO - 2 - naphthyl) - gamma - lower - alkyl - butyric acid with a halide of a strong acid, and then treating in the cold the resulting acid halide with a Friedel-Crafts type of catalyst, where X is a hydrocarbon group selected from the class consisting of lower alkyl groups and benzyl and phenyl groups.

5. The process which comprises reacting the half ester 3-carbo-alkoxy-4-(6-methoxy-2-naphthyl)-caproic acid with a halide of a strong acid, and then treating the resulting acid halide of the caproic acid with a Friedel-Crafts type of catalyst.

6. In the process of preparing methyl 1-ethyl-4-keto-7-methoxy-1,2,3,4-tetrahydrophenanthrene-2-carboxylate, the steps which comprise reacting the half ester 3-carbomethoxy-4-(6-methoxy-2-naphthyl)-caproic acid with a halogenating agent selected from the group consisting of phosphorus pentachloride and thionyl chloride, and then treating the resulting acid chloride with stannic chloride at a temperature of about 0° C.

WILLIAM S. JOHNSON.
DANIEL L. TURNER.

References Cited in the file of this patent

Johnson et al., J. Am. Chem. Soc., 70, 2612–13 (1948).

Johnson et al., J. Am. Chem. Soc., 72, 925–935 (1950).

Bachmann et al., J. Am. Chem. Soc., 64, 536–538 (1942).